(12) United States Patent
Singh et al.

(10) Patent No.: US 11,060,011 B2
(45) Date of Patent: Jul. 13, 2021

(54) COIL TUBING CLEANOUT FLUID

(71) Applicant: Halliburton Energy Services, Inc., Houston, TX (US)

(72) Inventors: Dipti Singh, Kingwood, TX (US); Michael Wayne Sanders, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 5 days.

(21) Appl. No.: 16/320,774

(22) PCT Filed: Aug. 24, 2016

(86) PCT No.: PCT/US2016/048458
§ 371 (c)(1),
(2) Date: Jan. 25, 2019

(87) PCT Pub. No.: WO2018/038726
PCT Pub. Date: Mar. 1, 2018

(65) Prior Publication Data
US 2019/0169485 A1 Jun. 6, 2019

(51) Int. Cl.
*C09K 8/52* (2006.01)
*E21B 37/00* (2006.01)

(52) U.S. Cl.
CPC ............... *C09K 8/52* (2013.01); *E21B 37/00* (2013.01); *C09K 2208/28* (2013.01)

(58) Field of Classification Search
CPC ........ C09K 8/467; C09K 8/032; C09K 8/035; C09K 8/52; C09K 8/03; C09K 8/40; C09K 8/42; C09K 8/46; C09K 2208/26; C09K 8/60; C09K 2208/08; C09K 2208/10; C09K 8/04; C09K 8/05; C09K 2208/32; C09K 8/424; C09K 2208/02; C09K 8/48; C09K 8/528; C09K 8/58; C09K 8/68; C09K 2208/00; C09K 2208/24; C09K 2208/28; C09K 8/44; C09K 8/516; C09K 8/584; C09K 8/588; C09K 8/62; C09K 8/74; C09K 2208/30; C09K 8/32; C09K 8/36; C09K 8/502; C09K 8/5045; C09K 8/506; C09K 8/508; C09K 8/512; C09K 8/602; C09K 8/706; C09K 8/76; C09K 8/80; C09K 8/845; C09K 8/90; E21B 33/13; E21B 33/14; E21B 43/16; E21B 47/0005; E21B 47/1015; E21B 21/06; E21B 21/00; E21B 33/138; E21B 43/26; E21B 37/00; E21B 21/01; E21B 21/003; E21B 33/16; E21B 36/00; E21B 36/003; E21B 36/04; E21B 41/02; E21B 43/14; E21B 43/267; E21B 7/00
See application file for complete search history.

(56) References Cited

U.S. PATENT DOCUMENTS

| | | | | |
|---|---|---|---|---|
| 4,888,120 A | * | 12/1989 | Mueller | C09K 8/145 507/227 |
| 5,458,197 A | * | 10/1995 | Chan | C09K 8/52 166/304 |
| 5,635,457 A | * | 6/1997 | Van Slyke | C09K 8/60 507/103 |
| 6,196,320 B1 | * | 3/2001 | Ray | C09K 8/52 166/270.1 |
| 6,269,880 B1 | * | 8/2001 | Landry | E21B 37/00 166/105.5 |
| 8,186,438 B2 | | 5/2012 | Ali et al. | |
| 2006/0276347 A1 | | 12/2006 | Lin et al. | |
| 2010/0170676 A1 | * | 7/2010 | Misselbrook | E21B 37/00 166/312 |
| 2010/0175881 A1 | | 7/2010 | Sullivan et al. | |
| 2013/0000916 A1 | * | 1/2013 | Li | C09K 8/52 166/310 |
| 2014/0338916 A1 | | 11/2014 | Vasquez et al. | |
| 2016/0084057 A1 | * | 3/2016 | Castro | E21B 43/26 166/308.1 |

FOREIGN PATENT DOCUMENTS

WO 2015069230 5/2015
WO WO2015/016884 * 11/2015

OTHER PUBLICATIONS

International Search Report and Written Opinion for PCT/US2016/048458 dated Aug. 24, 2016.
Oilfield Glossary—Screenout.

* cited by examiner

*Primary Examiner* — Kumar R Bhushan
(74) *Attorney, Agent, or Firm* — Thomas Rooney; C. Tumey Law Group PLLC

(57) ABSTRACT

Coil tubing cleanout fluids comprising a clay are provided. A method may comprise introducing a cleanout fluid into a wellbore wherein the cleanout fluid comprises a carrier fluid and a clay; and entraining solid particles in the cleanout fluid wherein the solid particles are disposed in the wellbore.

18 Claims, 5 Drawing Sheets

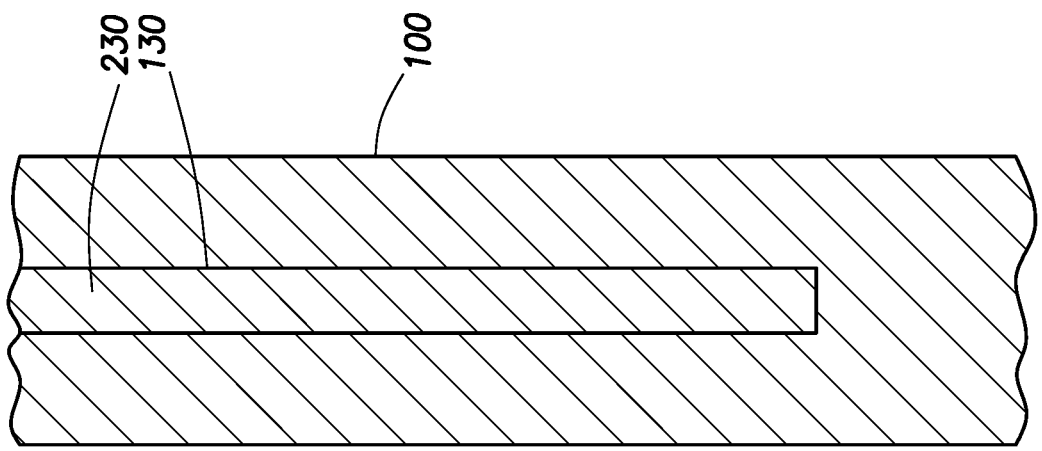
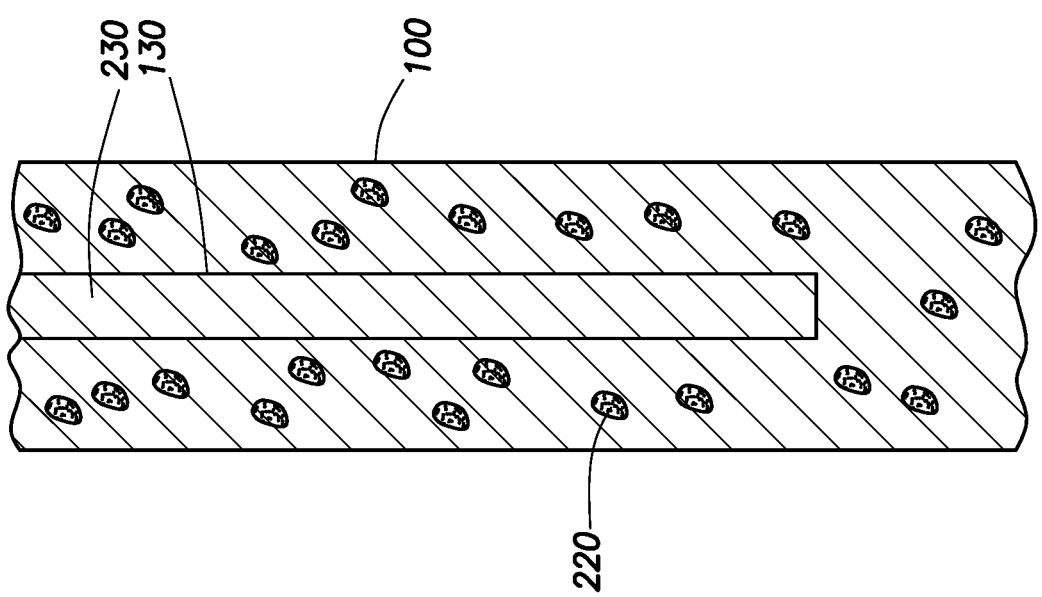

COIL TUBING CLEANOUT FLUID

BACKGROUND

Often after drilling or during production of a well in a subterranean formation, debris such as drill cuttings, sand, proppant, scale, crushed portions of the formation, gun debris, etc. may be generated and collect in a wellbore. In some cases, the debris may collect at the bottom as in the case of non-deviated wellbores or where the wellbore changes direction such as in the case of deviated wellbores. In a hydraulic fracturing or "fracking" operations, the wellbore may fill with proppant if the proppant laden fluid stops flowing into the subterranean formation. When proppant builds up in a wellbore, a "screen out" may occur where no more proppant can be safely pumped because the pressure would reach unsafe levels.

Various methods have been used to remove this debris, termed "wellbore cleanout" with limited success. Some operators remove the debris by using a drill bit and associated equipment to disturb the debris by partially drilling into it, and by then dragging the drill bit uphole while maintaining circulation of a drilling fluid, thereby entraining some of the debris. This dragging of the tool uphole while circulating the drilling fluid is commonly known as the "sweep cycle." Such a method has had limited success, typically, as the drill bit itself may be poorly designed to disturb the debris and entrainment of the debris in the drilling fluid may be mostly ineffective. Further, use of a drilling apparatus for well cleanout may be very expensive.

More recently coiled tubing has been used with greater success to resolve issues related to wellbore debris. The cleanout procedure may comprise pumping a high viscosity fluid into the well which may carry the solids to the surface. However, current fluids may lose viscosity with temperature and high shear leading to poor solids entrainment.

BRIEF DESCRIPTION OF THE DRAWINGS

These drawings illustrate certain aspects of some of the embodiments of the present invention, and should not be used to limit or define the invention.

FIGS. 2a-2e area schematic illustrations of an example method of using a cleanout fluid.

DETAILED DESCRIPTION

Figure 1:
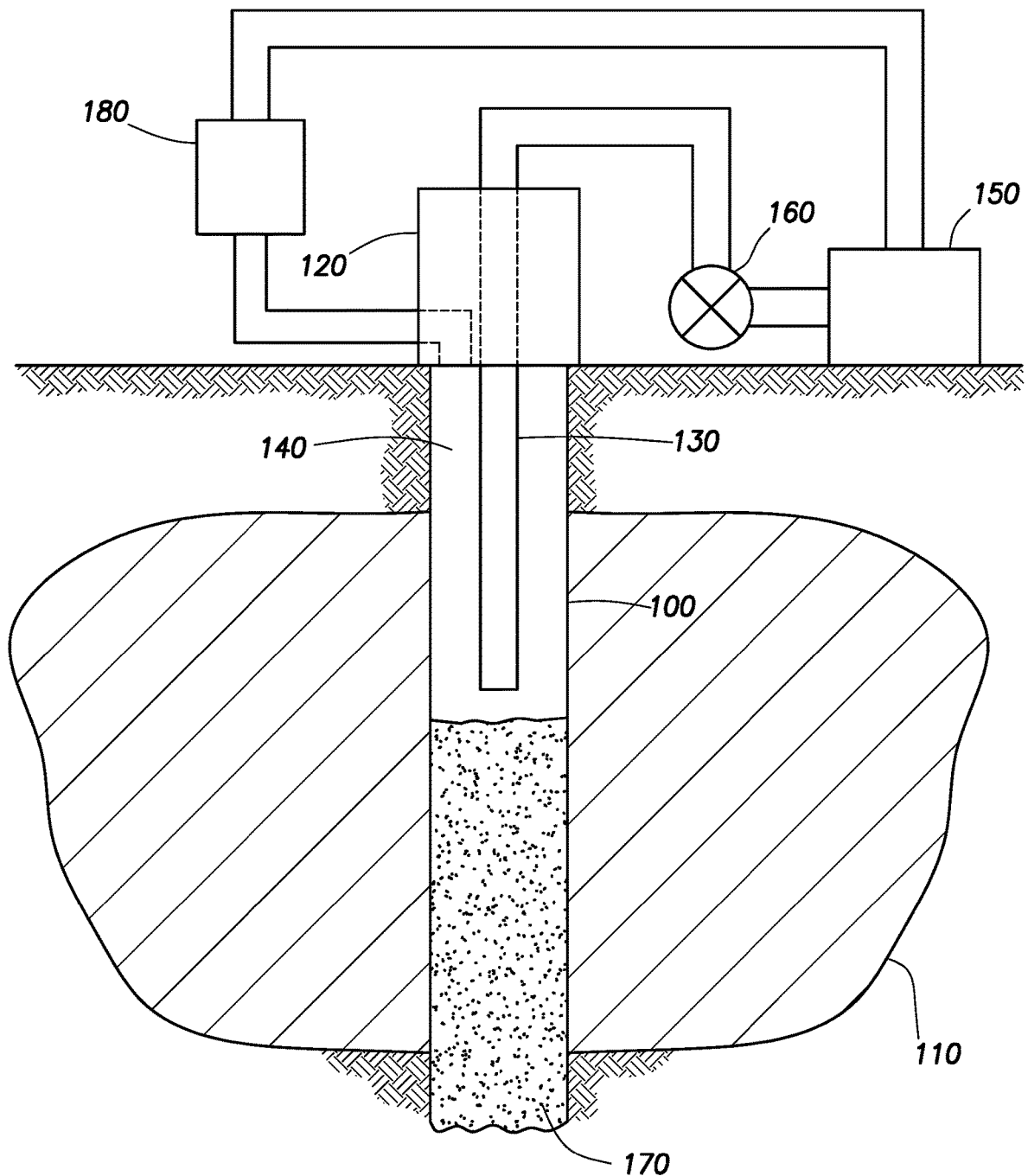
FIG. 1 is a schematic illustration of an example fluid handling system for the preparation and delivery of a cleanout fluid into a wellbore.

The systems, methods, and/or compositions disclosed herein may relate to wellbore operations and, in some systems, methods, and compositions, to introduction of a cleanout fluid comprising a carrier fluid, a clay, and an optional gelling agent into a wellbore. The wellbore treatment may be performed at any stage of the well life. In particular the cleanout fluid may be used during drilling and stimulation operations to, for example, remove solids from the wellbore. Solids may be any solids including, but not limited to, proppant, drill cuttings, sand, scale, crushed portions of the formation, gun debris, formation fines, etc. A cleanout fluid comprising a clay may have many advantages, only some of which may be alluded to herein. A cleanout fluid comprising a clay may be more stable under high temperature and high shear and may exhibit little to no loss of viscosity through multiple high temperature high shear cycles. Furthermore, a cleanout fluid comprising a clay may be compatible with current equipment and may replace other cleanout fluids that do not have the potentially desirable properties of the present cleanout fluid. While the present cleanout fluid may be used in a variety of wellbores, they make be particularly suited for use in high temperature wells. For example, wells that have a temperature of 200° F. or more.

One example is directed to a method of removing debris particles from a wellbore, in part, through the use of a Bernoulli effect. This effect is described by Bernoulli's law and is equivalent to lift commonly associated with flight. For systems subject to the Bernoulli effect, an increase in the velocity of horizontal fluid flow will result in a decrease in the static pressure. In certain examples, debris particles within the wellbore may be entrained in a high-velocity fluid stream of the cleanout fluid with a vector perpendicular to the wellbore axis, termed the "horizontal flow rate". Because the wellbore may be, and often is, deviated, the horizontal flow itself may be only nominally "horizontal." Any horizontal flow rate is normally circular based on the characteristics of the wellbore itself and is about an axis of rotation that is generally parallel to the wellbore axis. It is preferable that the axis of rotation be approximately coincident with the wellbore axis itself, facilitating removal of the debris particles, although depending on the wellbore configuration, a coincident wellbore axis and axis of rotation may not be possible.

Once the particles have gained upward velocity to the surface, upward fluid movement will tend to carry the particles upward. However, if, as in most cases, the particles are heavier than the cleanout fluid, then there will be a relatively slow drop of the particles downward, i.e., the "dropout effect." This particle movement can be defined as a passing or conduction-type movement, as gravitational forces draws the particle through the cleanout fluid. This type movement can generally be negated by some upward fluid flow and more importantly by using a more viscous clean out fluid to slow or negate the dropout effect.

The cleanout fluid may comprise a carrier fluid. A carrier fluid may comprise an aqueous liquid or aqueous solution or alternatively, may comprise an oil based liquid or mixture of oils. Suitable aqueous liquids that may be used in the cleanout fluid may include, but is not limited to, fresh water, salt water, brine, seawater, or any other aqueous liquid that does not undesirably react with the other components used herein or with the subterranean formation. Suitable oil based liquids may comprise alkanes, alkenes, long chain alcohols, crude oil, refined oil, alkanes, cyclic alkanes, olefins, aromatic organic compounds, aliphatic organic compounds, liquid parrafins, diesels, mineral oils, synthetic oils, terpenes, desulfurized hydrogenated kerosene, methyl 9-decenoate, and any other suitable oil based liquid known in the art. Without limitation, where long-term stability of the cleanout fluid is desired, the aqueous fluid may be one that comprises a low salt content or one that is substantially free of salts. The carrier fluid may be included in the cleanout fluid in any amount suitable for a particular application. Without limitation, the carrier fluid may be included in the cleanout fluid amount of about 10% to about 90% by volume. Alternatively, about 10% to about 80%, about 10% to about 70%, about 10% to about 60%, about 10% to about 50%, about 10% to about 40%, about 10% to about 30%, or about 10% to about 20%. One of ordinary skill in the art, with the benefit of this disclosure, should be able to select an appropriate kind and amount of carrier fluid for a particular application.

The cleanout fluid may further comprise a clay. Any clay that exhibits the desired properties such as increased viscosity in solution and thermal-viscosity stability may potentially be used. In particular, clays may, without limitation, be selected from the smectite group, modified clays, synthetic clays, and hectorite. In some examples, the clay may comprise a hectorite clay. Hectorite clay may be especially advantageous when used in an aqueous based cleanout fluid as illustrated in selected examples below. Other clays from the smectite group that potentially may be used include clays such as montmorillonite and bentonite. The clay may be a synthetic clay or a naturally occurring clay. Some examples of a synthetic clay may be, without limitation, a synthetic hectorite or a synthetic bentonite. The clay may be included in any amount to create a fluid with the desired viscosity and other properties. Without limitation, the clay may be included in the cleanout fluid amount of about 0.1% to about 10% by weight/volume. Alternatively, about 0.1% to about 1%, about 0.1% to about 5%, about 1% to about 5%, about 5% to about 10%, about 10%, or about 1% to about 2%. One of ordinary skill in the art, with the benefit of this disclosure, should be able to select an appropriate kind and amount of clay for a particular application.

The cleanout fluid may further comprise a gelling agent. Gelling agents may, among other things, increase the viscosity of a fluid. As was mentioned earlier, one factor to reduce entrained solids from falling out of the cleanout fluid is ensuing that there is sufficient viscosity to suspend all solids. In general, the viscosity of the cleanout fluid may be about 100 cP (centipoise) to about 1500 cP. Alternatively, the viscosity may be about 100 cP to about 200 cP, about 200 cP to about 400 cP, or about 400 cP to about 600 cP. In some examples, a cross linker may be added to further increase the viscosity. The cross linker may for example, increase the viscosity to about 2000 cP to about 5000 cP or more. If the cleanout fluid is exposed to an elevated temperature, shear, or both, the viscosity may decrease. The effects of temperature and shear are further discussed in examples below. Although a relatively higher viscosity cleanout fluid may be preferred for increased solids transport in some applications, a relatively lower viscosity cleanout fluid may have a reduced friction factor thereby allowing the fluid to be circulated at higher rates.

Suitable gelling agents may include, but are not limited to, guar gum, hydroxylpropyl guar, hydroxypropyl guar carboxymethyl hydroxypropyl guar, carboxymethyl cellulose, hydroxyethyl cellulose, and carboxymethylhydroxyethylcellulose (CMHEC); substituted and unsubstituted galactomannans including guar gum and guar derivatives, carboxymethylguar (CMG) carboxymethylhydroxypropylguar (CMHPG), xanthan gum, and succinoglycan; starch derivatives; gums including ghatti, Arabic, tragacanth, locust bean, karaya, carrageenan, algin, and derivatives of such gums, biopolymers and mixtures thereof, carboxymethylhydroxypropylguar (CMHPG), xanthan gum, succinoglycanand, and combinations thereof. The gelling agent may be present in any loading or concentration. Without limitatin, the gelling agent may be present in an amount of about 10 to about 100 pounds per 1000 gallons, about 10 to about 30 pounds per 1000 gallons, about 30 to about 50 pounds per 1000 gallons, about 50 to about 80 pounds per 1000 gallons, about 80 to about 100 pounds per 1000 gallons of cleanout fluid. One of ordinary skill in the art, with the benefit of this disclosure, should be able to select an appropriate kind and amount of gelling agent for a particular application.

The cleanout fluid may further comprise a crosslinking agent. A crosslinking agent may create crosslinked chemical bonds within and in between gelling agent molecules to further increase the viscosity of the cleanout fluid. The crosslinking may allow increased solids transport by increasing the viscosity without adding more clay or gelling agent. In some examples, a crosslinking agent may comprise a metal based crosslinker or a boron based crosslinker. One of ordinary skill in the art, with the benefit of this disclosure, should be able to select an appropriate kind and amount of a crosslinking agent for a particular application.

Without limitation, the cleanout fluid may further comprise a friction reducer. In some examples, the friction reducer may be a synthetic polymer. Additionally, for example, the friction reducing polymer may be an anionic polymer or a cationic polymer, in accordance with particular examples. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. Indeed, as used herein, the term "polymer" in the context of a friction reducing polymer, is intended to refer to the acid form of the friction reducing polymer, as well as its various salts.

The friction reducing polymer may be included in the cleanout fluid, for example, in an amount of about 0.01% to about 2% by weight of the cleanout fluid. One of ordinary skill in the art with the benefit of this disclosure will be able to select an appropriate kind and amount of a friction reducer for a particular application.

In some examples, a cleanout fluid may further comprise an additive including, but not limited to, a salt; a weighting agent; an inert solid; a fluid loss control agent; an emulsifier; a dispersion aid; a corrosion inhibitor; an emulsion thinner; an emulsion thickener; a high-pressure, high-temperature emulsifier-filtration control agent; a surfactant; a lost circulation material; a foaming agent; a gas; a pH control additive; a breaker; a biocide; a stabilizer; a chelating agent; a scale inhibitor; a mutual solvent; an oxidizer; a consolidating agent; a complexing agent; fluid loss additive; and any combination thereof. In some examples, the cleanout fluid may be substantially fee of clay stabilizers.

The cleanout fluid, as described herein may have many advantages in some wellbores, only some of which may be mentioned herein. The cleanout fluid may retain viscosity after several periods of high shear at elevated temperatures. The ability to withstand high shear may be advantageous as the fluid may be re-used several times without losing significant viscosity. Without limitation, the cleanout fluid may be introduced into a wellbore though a tubular such as coil tubing. The inner diameter of a coil tubing is typically small relative to the wellbore. In such cases, there may be a need to pump a large volumetric flow rate of cleanout fluid in order to achieve adequate clean out. Flowing a large volumetric flow rate through a small area such as a tubular may cause a large increase in fluid velocity. The increased velocity may increase the shear forces experienced by the cleanout fluid and in some cleanout fluids, may lead to a permanent loss of viscosity. Additionally, if a wellbore is at an elevated temperature such as, for example, 150° F. or more or alternatively, 200° F. or more, the fluid may lose viscosity due to thermal effects. As will be shown in the example methods and figures below, the cleanout fluid may be able to retain viscosity after several cycles of shear at elevated temperature.

Example methods of using the cleanout fluid will now be described in more detail with reference to FIG. 1. Any of the previous examples of the cleanout fluid may apply in the context of FIG. 1. Referring now to FIG. 1, a wellbore 100 may be disposed into the ground wherein the wellbore 100 penetrates subterranean formation 110. Wellbore 100 may be any kind of wellbore including a straight wellbore, partially deviated wellbore, or fully deviated wellbore. The wellbore 100 may comprise a casing or alternatively, wellbore 100 may be an open hole. While not illustrated, wellbore 100 may comprise perforations, liners, shoes, production casings, and other downhole equipment known in the art. Wellbore 100 may comprise solids 170 as previously described. The solids 170 may partially or fully block the wellbore 100. As illustrated, the wellbore 100 is fully blocked which may be the result of a "screen-out" which as previously described may be the result of a hydraulic fracturing operation or due to solids entrainment in the produced fluids collecting in the area adjacent to the perforations. The solids 170 may also be entrained in another fluid or fluids. A wellhead 120 may be fluidically connected to wellbore 100 whereby fluids may be conveyed into wellbore 100. Wellhead 120 may comprise a system of spools, valves, and assorted adaptors that provide pressure control of the well and may allow for coil tubing 130 to be inserted into wellbore 100. Wellhead 120 may provide multiple fluid flow paths including through an annulus 140 formed by wellbore 100 and coil tubing 130. A fluid handling system 150 may include may include mobile vehicles, immobile installations, skids, hoses, tubes, fluid tanks or reservoirs, pumps, valves, and/or other suitable structures and equipment. For example, fluid handling system 150 may comprise the cleanout fluid and a pump 160 capable of conveying the cleanout fluid into wellbore 100 through coil tubing 130. Pump 160 may be a high pressure pump capable of pumping a fluid at about 10,000 psi or more. As illustrated in FIG. 1, fluid handling system 150 and pump 160 may be configured to convey the cleanout fluid into wellbore 100 through coil tubing 130 and out of wellhead 120 by means of the annulus 140. In an alternative example not illustrated, fluid handling system 150 and pump 160 may be configured to convey the cleanout fluid into wellbore 100 though annulus 140 and out of wellhead 120 by means of coil tubing 130. Fluid handling system 150 may comprise a coil tubing truck for onshore applications, or in offshore applications, a coil tubing skid.

With further reference to FIG. 1, a cleaning system 180 may be present for cleaning the cleanout fluid to, for example, remove entrained solids from the fluid. The cleaning system 180 may comprise, without limitation, a series of screens, meshes, shale shakers, flocculating tanks, filters, chemicals, and other means known in the art to separate entrained solids from the fluid. The cleaning system 180 fluid may, for example, substantially remove all of the entrained solids in the cleanout fluid. In another example, the cleaning system may remove only a selected size range of entrained solids. Fluid handling system 150 may be configured to recycle the cleanout fluid. As discussed above, the cleanout fluid may be conveyed into wellbore 100 by means of coil tubing 130 or annulus 140. In either example, fluid handling system 150 may be configured to recycle the cleanout fluid by providing a closed fluid path for the cleanout fluid to flow. In one example, the cleanout fluid may be conveyed into wellbore 100 through coil tubing 130 and then flow through annulus 140 to wellhead 120, into cleaning system 180 wherein the entrained solids may be removed and then to fluid handling system 150. The cleaned cleanout fluid may be re-conveyed into wellbore 100 thereby completing the closed fluid flow path. In another example, the cleanout fluid may be conveyed into wellbore 100 through annulus 140 and then flow through coil tubing 130 to wellhead 120 and into fluid handling system 150 and then into cleaning system 180 wherein the entrained solids may be removed. The cleaned cleanout fluid may be re-conveyed into wellbore 100 thereby completing the closed fluid flow path. By recycling the cleanout fluid, the costs of cleaning the wellbore may be reduced as less cleanout fluid may be needed. In another example, the cleanout fluid may not be recycled. The cleanout fluid may be conveyed out of wellbore 100 and into a retention pit which is not illustrated.

With further reference to FIG. 1, fluid handling system 150 may further comprise a means for mixing the cleanout fluid. The means for mixing may comprise storage tanks, mixing vessels, conveying systems, and control systems to mix the cleanout fluid on the fly to a pre-designed recipe or mixture. The cleanout fluid may be designed to, for example, sustain at least about 5 cycles though wellbore 100 and fluid handling system 150 without substantial loss of viscosity. In another example, the cleanout fluid may be mixed off-site at a preparation location and transported to the well-site. The pre-prepared cleanout fluid may be conveyed into fluid handling system 150 by means of a supply line.

Figure 2A:
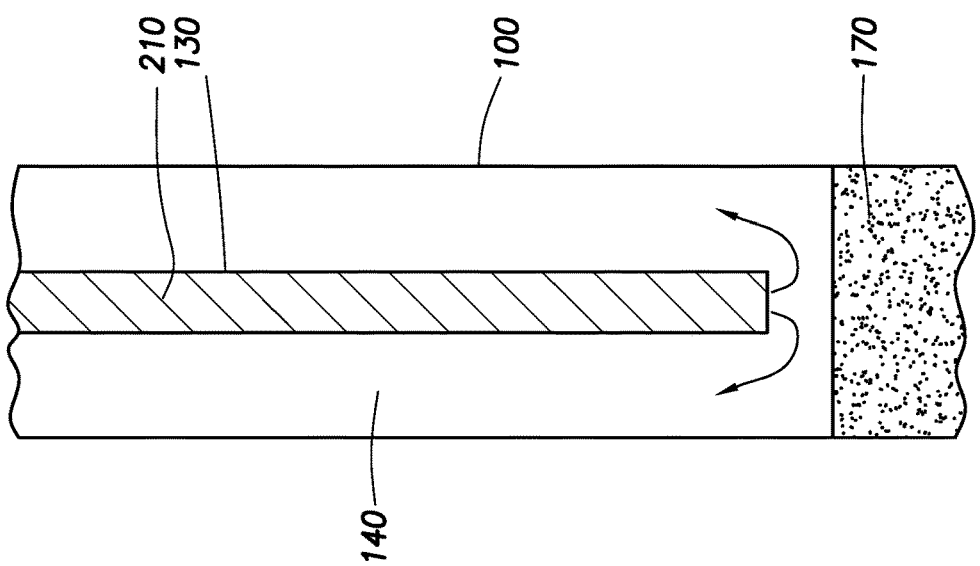
Figure 2B:
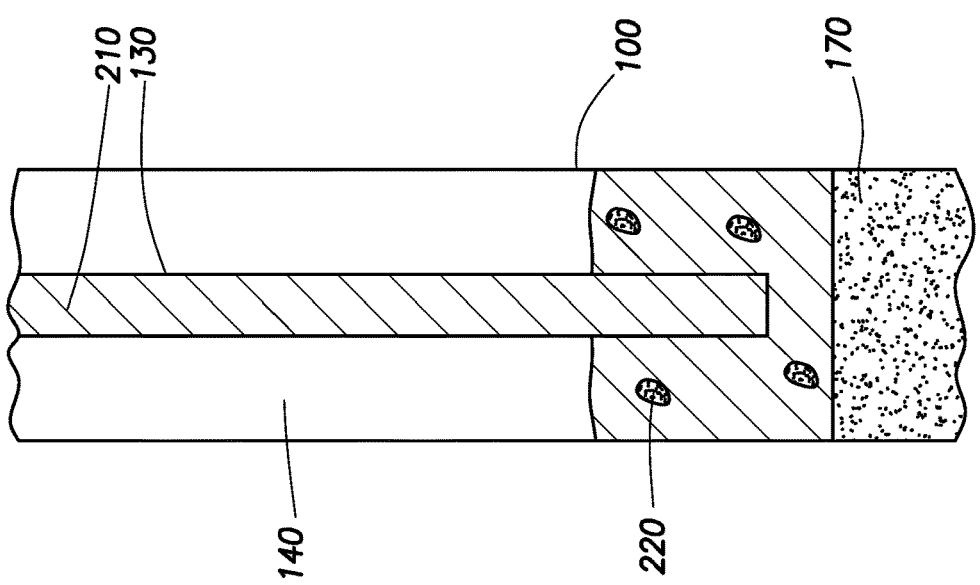
Figure 2C:
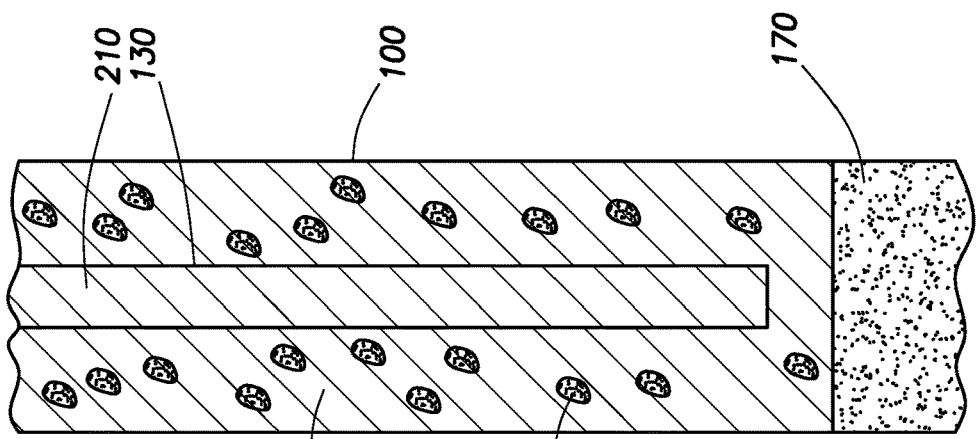

Example methods of using the cleanout fluid will now be described in more detail with reference to FIGS. 2a-2e. Any of the previous examples of the treatment fluids may apply in the context of FIGS. 2a-2e. Referring now to FIG. 2a, in some examples a cleanout fluid 210 may be conveyed into wellbore 100 through coil tubing 130. Again annulus 140, in this example, is defined by the space between wellbore 100 and coil tubing 130. Solids 170 may be present in the wellbore 100. As illustrated, cleanout fluid 210 may flow down coil tubing 130 and up annulus 140. With reference to FIG. 2b, cleanout fluid 210 may contact solids 170 and may entrain some particles of solids 170. The entrained solid particles 220 may be substantially trapped in the cleanout fluid 210 wherein the entrained solid particles 220 should not tend to migrate downwards once entrained. The cleanout fluid 210 may flow up annulus 140 to wellhead 120 as previously illustrated in FIG. 1. Entrained solid particles 220 may follow the flow path of the bulk fluid and may be transported by cleanout fluid 210 to wellhead 120. As cleanout fluid 210 entrains solids 170, the total volume of solids 170 in wellbore 100 may decrease. With reference to FIG. 2c, as the total volume of solids 170 may decrease, coil tubing 130 may be extended further into wellbore 100. Extending coil tubing 130 may allow cleanout fluid 210 to further contact remaining solids 170. With reference to FIGS. 2d and 2e, after a given time, cleanout fluid 210 may have entrained substantially all solid 170 in wellbore 100. A spacer fluid 230 may be conveyed though coil tubing 130 to displace cleanout fluid 210 and entrained solid particles 220. Spacer fluid 230 may be any kind of fluid. For example, without limitation, a drilling mud, fracturing fluid, weighted fluid, or any other fluid that may displace cleanout fluid 210 and entrained solid particles 220.

In some examples, with additional reference to FIG. 1, the cleanout fluid 210 may be conveyed into wellbore 100 through coil tubing 130 and allowed to flow through annulus 140 and back into fluid handling system 150. The cleanout fluid 210 may then have entrained solid particles 220 removed before being conveyed by pump 160 back into wellbore 100. In another example, the cleanout fluid 210 may be conveyed down through the annulus 140 and flow up through the fluid handling system 150.

Accordingly, this disclosure describes systems, compositions, and methods that may be used for coil tubing cleanout. Without limitation, the systems, compositions and methods may further be characterized by one or more of the following statements:

Statement 1: A method comprising: introducing a cleanout fluid into a wellbore wherein the cleanout fluid comprises a carrier fluid and a clay; and entraining solid particles in the cleanout fluid wherein the solid particles are disposed in the wellbore.

Statement 2: The method of statement 1 wherein the clay comprises a smectite clay.

Statement 3: The method of statement 1 or statement 2 wherein the clay comprises a hectorite clay.

Statement 4: The method of any one of statements 1 to 3 wherein the clay is present in an amount of about 0.1% to about 2% by weight of the cleanout fluid.

Statement 5: The method of any one of statements 1 to 4 wherein the cleanout fluid further comprises a gelling agent selected from the group consisting of guar gum, hydroxyl propyl guar, carboxymethyl hydroxypropyl guar, carboxymethyl cellulose, hydroxyethyl cellulose, and combinations thereof.

Statement 6: The method of any one of statements 1 to 5 wherein the cleanout fluid has a viscosity of at least 100 cP.

Statement 7: The method of any one of statements 1 to 6 wherein the wellbore further comprises a coil tubing, wherein an annulus is defined by the region of space between the inner diameter of the wellbore and the outer diameter of the coil tubing.

Statement 8: The method of statement 7 wherein the cleanout fluid is introduced into the wellbore through the coil tubing.

Statement 9: The method of statement 7 wherein the cleanout fluid is introduced into the wellbore through the annulus Statement 10: The method of any one of statements 1 to 9 further comprising the step of returning the cleanout fluid with the entrained solid particles to a wellhead.

Statement 11: The method of any one of statements 1 to 10 further comprising the step of removing the entrained solid particles from the cleanout fluid after the step of returning the cleanout fluid to the wellhead Statement 12: A system for removing solid particles from a wellbore comprising: a cleanout fluid comprising: a carrier fluid; and a clay; a fluid handling system comprising the cleanout fluid; and a pump configured to pump the cleanout fluid into a wellbore.

Statement 13: The system of statement 12 wherein the clay comprises a smectite clay.

Statement 14: The system of statement 12 or statement 13 wherein the clay comprises a hectorite clay.

Statement 15: The system of any one of statements 12 to 14 wherein the clay is present in an amount of about 0.1% to about 2% by weight of the cleanout fluid.

Statement 16: The system of any one of statements 12 to 15 further comprising a cleaning system configured to remove solids from the cleanout fluid.

Statement 17: The system of any one of statements 12 to 16 further comprising a coil tubing, wherein an annulus is defined by the region of space between the inner diameter of the wellbore and the outer diameter of the coil tubing.

Statement 18: The system of statement 17 wherein the fluid handling system and pump are configured to convey the cleanout fluid into the wellbore through the coil tubing.

Statement 19: The system of statement 17 wherein the fluid handling system and pump are configured to convey the cleanout fluid into the wellbore through the annulus.

Statement 20: The system of any one of statements 17 to 19 wherein a closed loop for circulating the cleanout fluid is defined comprising the pump, the fluid handling system, the annulus, and the coil tubing.

The exemplary cleanout fluids disclosed herein may directly or indirectly affect one or more components or pieces of equipment associated with the preparation, delivery, recapture, recycling, reuse, and/or disposal of the cleanout fluids. For example, the cleanout fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant compositions. The cleanout fluids may also directly or indirectly affect any transport or delivery equipment used to convey the cleanout fluids to a well site or downhole such as, for example, any transport vessels, conduits, pipelines, trucks, tubulars, and/or pipes used to compositionally move the cleanout fluids from one location to another, any pumps, compressors, or motors (e.g., topside or downhole) used to drive the cleanout fluids into motion, any valves or related joints used to regulate the pressure or flow rate of the cleanout fluids, and any sensors (i.e., pressure and temperature), gauges, and/or combinations thereof, and the like. The disclosed cleanout fluids may also directly or indirectly affect the various downhole equipment and tools that may come into contact with the cleanout fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

Figure 3:
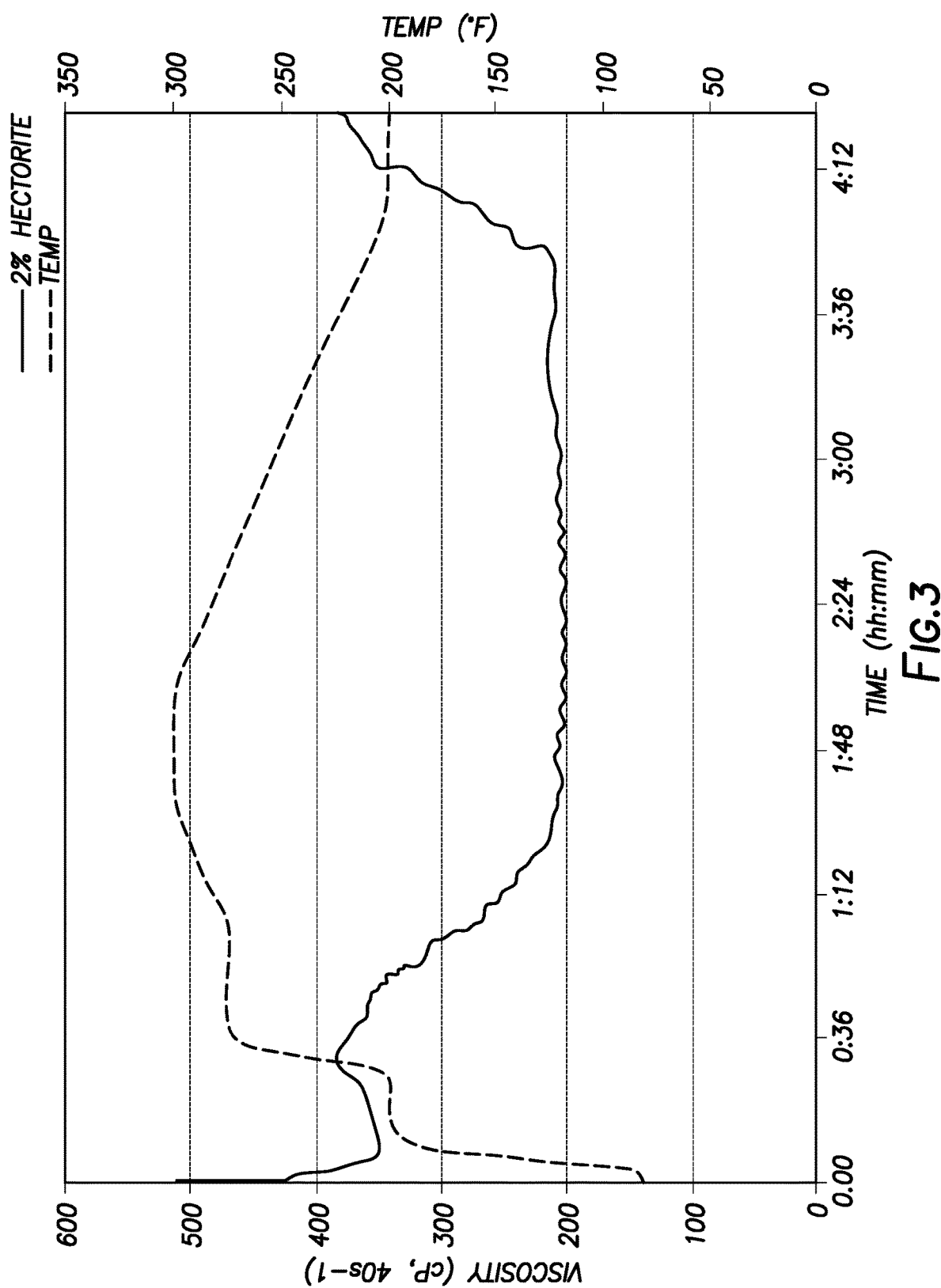
FIG. 3 is a chart of a cleanout fluid viscosity measurement under shear.

A cleanout fluid was prepared using 2% synthetic hectorite in water. The fluid was then tested at constant shear at 300° F. It was observed that the viscosity was regained after cooling to about 200° F. The results are shown in FIG. 3.

Example 2

Figure 4:
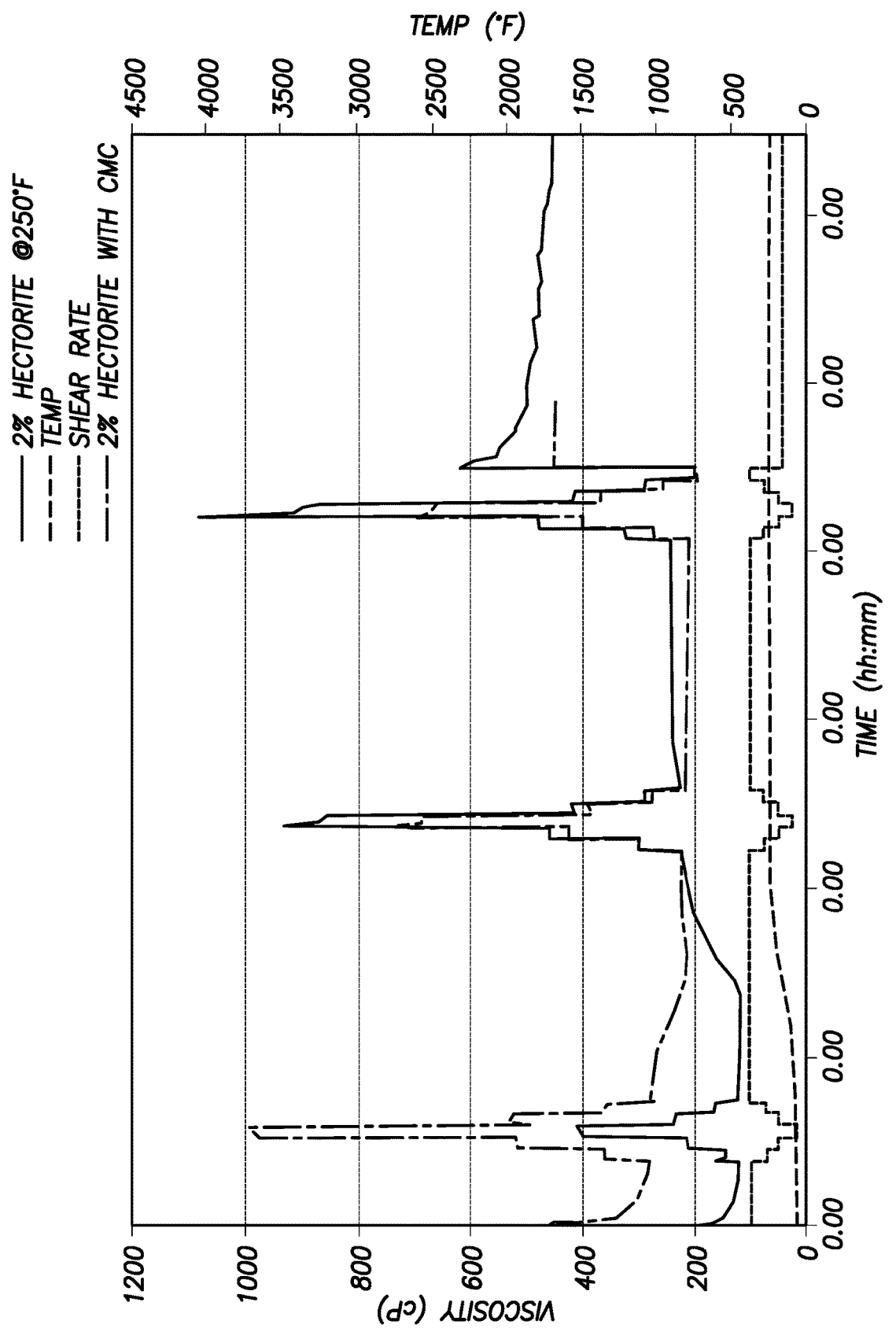
FIG. 4 is a chart of a cleanout fluid viscosity at various temperatures.

Two cleanout fluids were prepared with 2% synthetic hectorite and 2% synthetic hectorite in water with carboxymethyl cellulose. Each fluid was then tested for stability of the viscosity by exposure to repeated shear cycles at an elevated temperature of 250 OF. The results are shown in FIG. 4. It was observed that both fluids were able to regain and retain viscosity after repeated cycles of high shear. After 3 shear cycles, no loss of viscosity was observed in either gel system. The 2% synthetic hectorite viscosity regain was about 350 cP at cP at 100 $s^{-1}$ while the 2% synthetic hectorite with carboxymethyl cellulose viscosity gain was approximately 200 cP at 100 $s^{-1}$.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
    introducing a cleanout fluid into a wellbore through a coil tubing wherein the cleanout fluid comprises a carrier fluid and a clay;
    contacting the cleanout fluid with a screened-out zone in the wellbore, the screened-out zone comprising a mass of solid particles which fully block the wellbore;
    entraining at least a portion of solid particles from the mass of solid particles in the cleanout fluid, and
    flowing the entrained solid particles from the wellbore through an annulus defined by a region of space between an inner diameter of the wellbore and an outer diameter of the coil tubing.

2. The method of claim 1 wherein the clay comprises a smectite clay.

3. The method of claim 1 wherein the clay comprises a hectorite clay.

4. The method of claim 1 wherein the clay is present in an amount of about 0.1% to about 2% by weight of the cleanout fluid.

5. The method of claim 1 wherein the cleanout fluid further comprises a gelling agent selected from the group consisting of guar gum, hydroxyl propyl guar, carboxymethyl hydroxypropyl guar, carboxymethyl cellulose, hydroxyethyl cellulose, and combinations thereof.

6. The method of claim 1 wherein the cleanout fluid has a viscosity of at least 100 cP.

7. The method of claim 1 wherein the cleanout fluid is further introduced into the wellbore through the annulus.

8. The method of claim 1 further comprising returning the cleanout fluid with the entrained solid particles to a wellhead.

9. The method of claim 8 further comprising removing the entrained solid particles from the cleanout fluid after the step of returning the cleanout fluid to the wellhead.

10. A method comprising:
    providing a cleanout fluid comprising:
        a carrier fluid;
        hectorite clay; and
        carboxymethyl cellulose;
    introducing the cleanout fluid into a wellbore through a coil tubing;
    contacting the cleanout fluid with a screened-out zone in the wellbore, the screened-out zone comprising a mass of solid particles which fully block the wellbore;
    entraining at least a portion of the solid particles from the mass of solid particles in the cleanout fluid; and
    flowing the cleanout fluid with the entrained solid particles out of the wellbore through an annulus defined by a region of space between an inner diameter of the wellbore and an outer diameter of the coil tubing.

11. The method of claim 10 wherein the carrier fluid is an aqueous carrier fluid.

12. The method of claim 10 wherein the carrier fluid is an oil based carrier fluid.

13. The method of claim 10 wherein the hectorite clay is present in an amount of about 0.1% to about 2% by weight of the cleanout fluid.

14. The method of claim 10 wherein the cleanout fluid further comprises a crosslinking agent.

15. The method of claim 10 wherein the cleanout fluid has a viscosity of at least 100 cP.

16. The method of claim 10 wherein the wellbore has a temperature of greater than 150° F.

17. The method of claim 10 further comprising removing the entrained solid particles from the cleanout fluid after flowing the cleanout fluid with the entrained solid particles out of the wellbore.

18. The method of claim 17 further comprising returning the cleanout fluid to the wellbore through the coil tubing.

* * * * *